United States Patent

Karecki et al.

[15] 3,651,986
[45] Mar. 28, 1972

[54] CREDIT CARD AUTOMATIC CURRENCY DISPENSER

[72] Inventors: Marion R. Karecki; Thomas R. Barnes, both of Dallas, Tex.

[73] Assignee: Docutel Corporation, Dallas, Tex.

[22] Filed: July 29, 1970

[21] Appl. No.: 59,156

[52] U.S. Cl. .................................221/12, 49/35, 312/223
[51] Int. Cl. ...........................................................G07f 7/02
[58] Field of Search...................221/9, 10, 12, 13, 206, 194,
221/217–220, 253, 259, 15, 151, 153, 263–266;
190/66, 69; 312/223; 232/44; 194/4; 49/35, 30

[56] References Cited

UNITED STATES PATENTS

| | | | |
|---|---|---|---|
| 3,316,561 | 5/1967 | Newkirk | 49/30 |
| 3,039,582 | 6/1962 | Simsian | 194/4 E |
| 2,508,159 | 5/1950 | Haas | 221/153 |

Primary Examiner—Samuel F. Coleman
Assistant Examiner—Thomas E. Kocovsky
Attorney—Richards, Harris & Hubbard

[57] ABSTRACT

A currency dispenser automatically delivers a medium of exchange in packets in response to a coded credit card presented thereto. The coded credit card is presented to the currency dispenser and an initial check is made to determine if the card has the proper format. After checking the credit card format, coded information thereon is evaluated to check the user's identity prior to authorizing him to receive cash from the machine. When each of several additional checks of the credit card code have been completed, the old code is removed and substituted with a new code. The new code contains the same information as the old but updated to reflect an additional currency dispensing transaction. Both the original code and the updated code are scrambled in accordance with a changing key. Scrambling the credit card code after each use thereof minimizes the chance of unauthorized use of the currency dispenser. When the checks of the credit card code indicate the user is entitled to receive the amount of currency he has selected, a storage container for the packets of currency transports the required number of packets by a positive feed drive to a cash drawer. The cash drawer opens to a detent position which allows the customer to then move the drawer to a fully open position to remove his currency. Upon release of the cash drawer, it returns to a partially opened position from which it automatically closes after a preset time limit.

21 Claims, 13 Drawing Figures

PATENTED MAR 28 1972

INVENTORS:
MARION R. KARECKI
THOMAS R. BARNES

Richards, Harris & Hubbard
ATTORNEYS

PATENTED MAR 28 1972　　　3,651,986

INVENTORS:
MARION R. KARECKI
THOMAS R. BARNES

Richards, Harris & Hubbard
ATTORNEYS

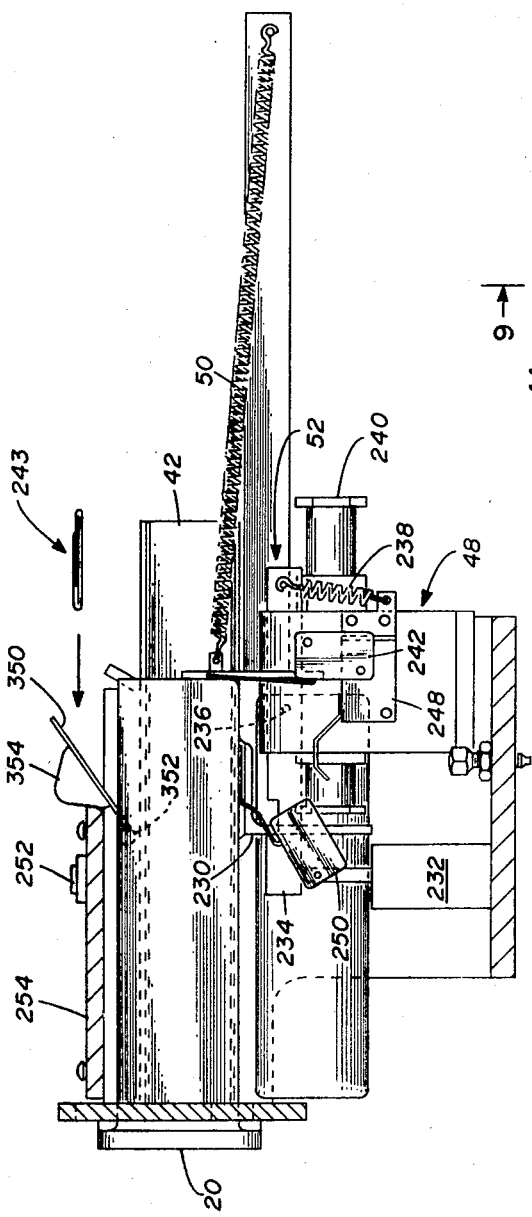
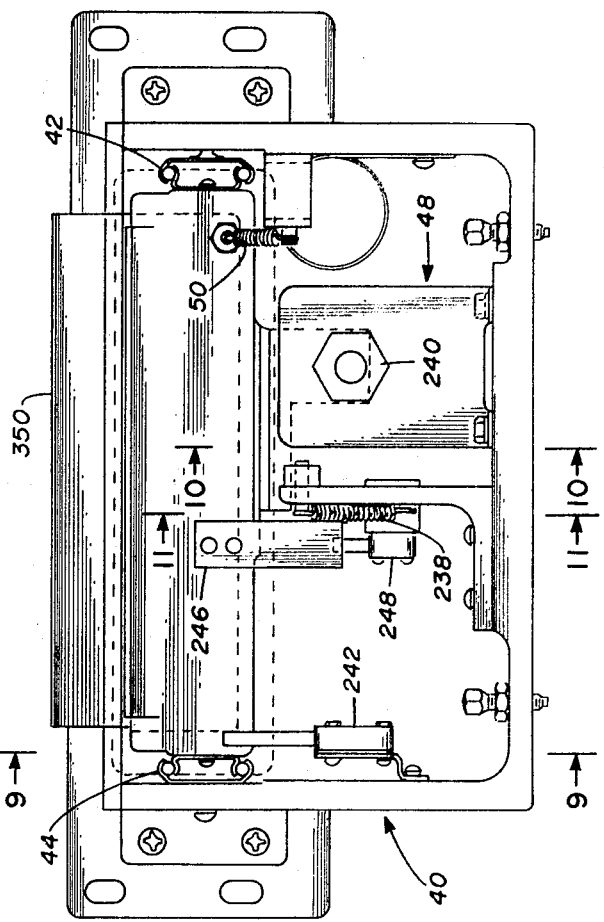
FIG. 8
FIG. 9
INVENTORS:
MARION R. KARECKI
THOMAS R. BARNES
Richards, Harris & Hubbard
ATTORNEYS

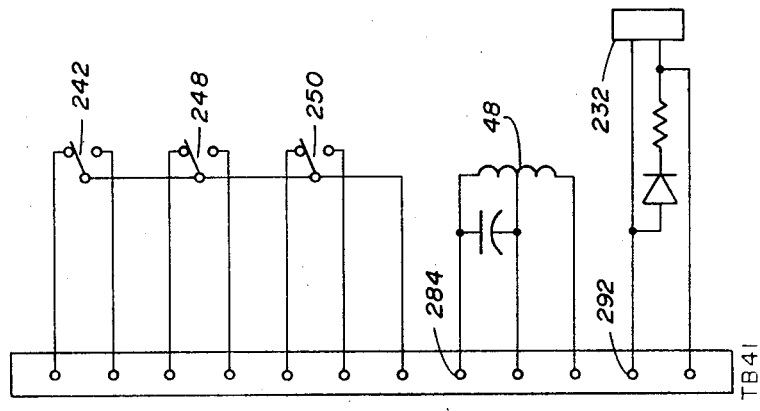
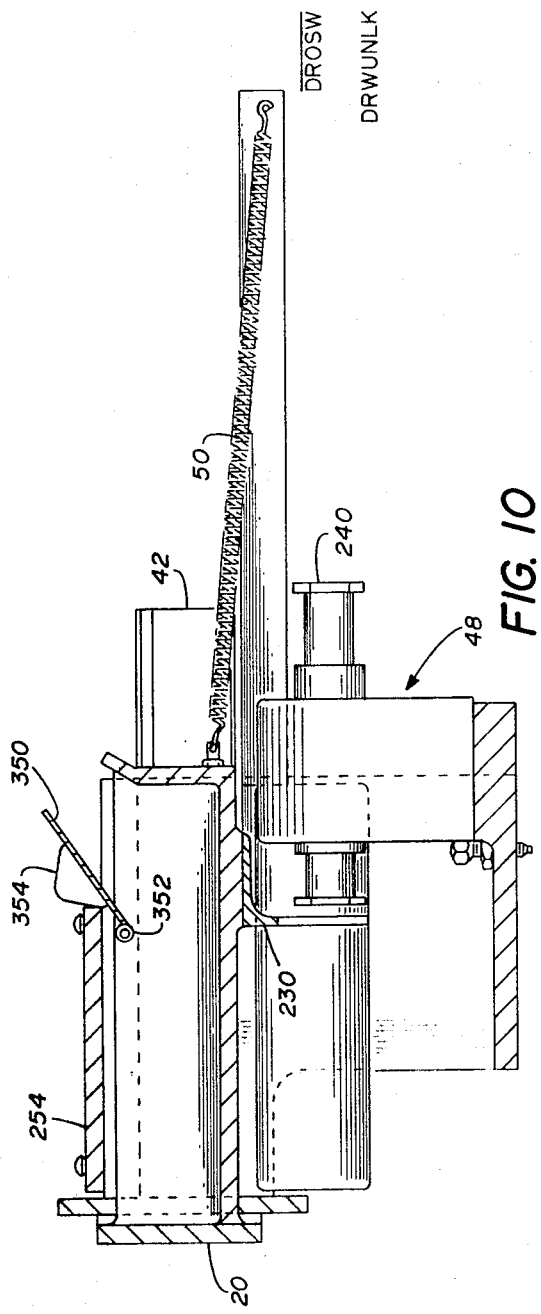
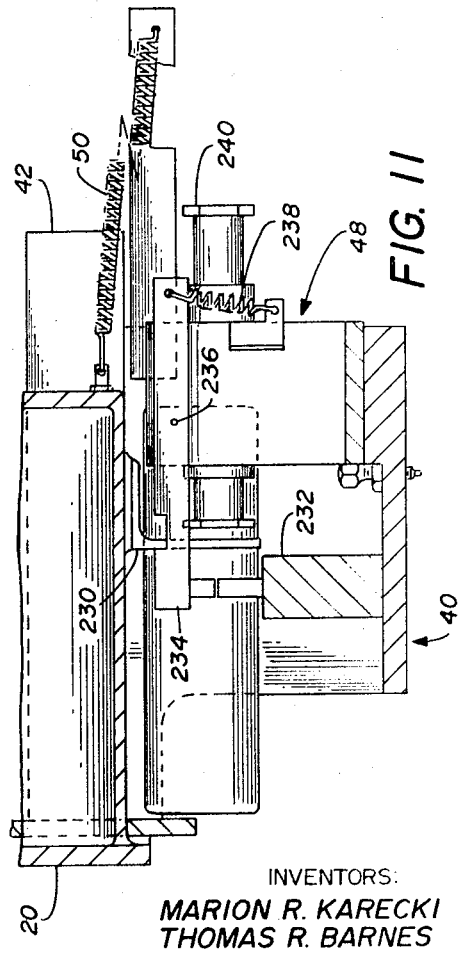
INVENTORS:
MARION R. KARECKI
THOMAS R. BARNES
Richards, Harris & Hubbard
ATTORNEYS

INVENTORS:
MARION R. KARECKI
THOMAS R. BARNES

Richards, Harris & Hubbard
ATTORNEYS

CREDIT CARD AUTOMATIC CURRENCY DISPENSER This invention relates to a currency dispenser, and more particularly to a coded document-actuated currency dispenser.

Recent studies have shown that attempts are being made by the banking system to influence the general public to use fewer checks in their financial transactions. This is primarily due to the difficulty of handling and processing large amounts of paper. In its place, there appears to be a wider use of credit cards for the completion of daily household and business transactions. Although there is a continued heavy use of checks and an increasing use of credit cards, we are not likely to become a cashless society in the near future. To provide the required amount of cash to complete some business and personal transactions, banks, in the past, have opened more and more branches for customer convenience. Unfortunately, the construction and operation of these many branch banks is expensive and unprofitable.

To provide the consumer with a source of ready cash without the expense of branch banking, banks are resorting to the use of automatic currency dispensing machines that make cash available to bank customers on a twenty-four hour basis.

Heretofore, the available automatic currency dispensing machines lacked compatibility with bank credit cards and the convenience and speed of data processing. With many of the prior currency dispensing machines, the customer was required to yield up his identification card with each use, thereby creating handling problems and costs for the bank which were of equal magnitude with the present day check handling problems and costs. Other available machines required the customer to carry a supply of check-like vouchers, which he and the bank must replenish periodically as required. Again, this presented many of the same problems currently experienced when handling checks. Of prime importance, of course, in the operation of any automatic money dispenser is the security of the stored cash. To be acceptable, an automatic cash dispenser must be essentially tamperproof.

An object of the present invention is to provide a coded document activated automatic dispenser. Another object of the present invention is to provide a code actuated automatic currency dispensing machine. A further object of this invention is to provide code scrambling security in a code actuated dispenser. Still another object of this invention is to provide positive feed delivery in automatic dispensing apparatus. A still further object of this invention is to provide controlled, timed, sequential operation of a dispensing drawer in automatic dispensing apparatus.

In an automatic dispenser, a coded document is presented to the machine by a user. Initially, the machine performs a format check on the document to determine if the machine will properly respond. If the coded document presented is not of the correct format, it will be locked out thereby protecting the machine from an attempt to force an unauthorized document into the mechanism. If the initial check indicates the presented document has the proper format, a gate opens to permit the user to further insert the document into the machine for actuation thereof.

Upon the acceptance of a coded document by the dispensing apparatus of the present invention, the document proceeds to a first station where scrambled coded information stored thereon is read and sent to unscrambling logic. A customer's personal identification code as read from the presented document is checked by comparison with a code manually inserted by the user. If the coded customer identification number and the inserted identification number do not agree, the user is instructed to re-enter his personal code. This operation will be repeated until the customer inserts the correct code or a favorable comparison does not result after three attempts. If on the third attempt the stored code and the entered code do not agree, the coded document is transported to an internal storage bin and not returned to the user. When the customer enters an identification code which corresponds to that stored on the document presented, the date of last use, the number of previous uses in the same day, the total number of uses remaining, and the expiration date of the document are all checked. If the result of these checks indicates the user is entitled to receive the article to be dispensed, he is so informed and the document is recoded, with the data thereon updated to reflect the latest transaction.

After the code on the document as presented is read and sent to the unscrambling logic, an unscrambler converts the data into a series of separate, logically arranged data words. These data words, after being checked and updated as explained previously, are rescrambled in accordance with a scrambling key to produce a code arrangement different from the arrangement as read. Upon completion of the rescrambling, the document is recoded with the updated scrambled data. The code changing logic also includes circuitry for generating a different scrambling key for subsequent readings of the same coded documents.

In an automatic dispenser in accordance with the present invention, after the coded document has been returned to a user, a positive feed delivery system removes the article to be dispensed from a storage container. The positive feed system includes an adjustable gate for accurately metering the dispensed article. After leaving the storage container through the metering gate, the article is transported between pinch rollers and a series of belted rollers to a dispensing drawer. This drawer is actuated by an energizing signal from circuitry in response to the user removing the presented document from the machine.

To complete the automatic dispensing operation of the dispenser in accordance with the present invention, an article is deposited into the dispensing drawer. Initially, a signal energizes an actuator to position the drawer from a retracted, closed position to a partially opened detent position from which it may be drawn to a full open position by the user. After the user has removed the article and releases the drawer, it automatically returns to the partially opened detent position. A timer measures the time the drawer is in the detent position, and after a preselected interval, as governed by the timer, it returns to the closed position. If, upon initially positioning the drawer to the partially opened detent position, the user does not pull the drawer to the fully open position before the expiration of a preselected time interval, the drawer will be returned to the closed position.

A more complete understanding of the invention and its advantages will be apparent from the specification and claims and from the accompanying drawings illustrative of the invention.

Referring to the drawings:

FIG. 8 is a rear view of the cash drawer assembly of FIG. 4;

FIG. 9 is a cross-sectional view of the cash drawer assembly taken along the line 9—9 of FIG. 8 and illustrating various microswitch sensors;

FIG. 10 is a sectional view of the cash drawer taken along the line 10—10 of FIG. 8 and illustrating the linear motor actuator;

FIG. 11 is a sectional view taken along the line 11—11 of FIG. 8 and illustrating a latch bar mechanism for the cash drawer;

FIG. 12 is an electrical schematic for the complete cash drawer assembly; and

GENERAL SYSTEM DESCRIPTION

Figure 1:
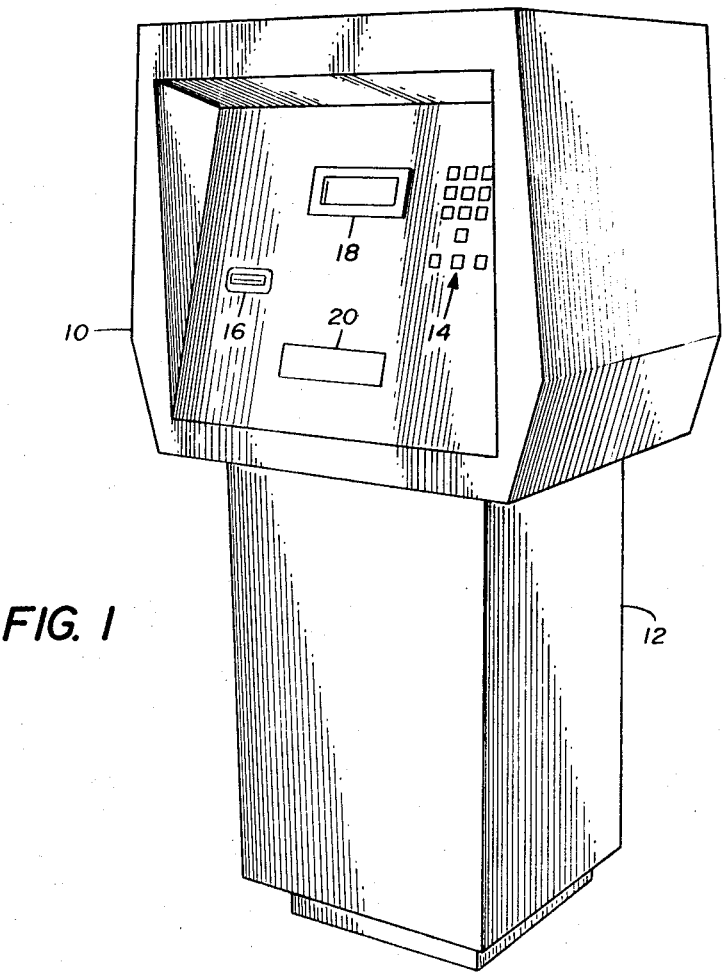
FIG. 1 is a pictorial view of a currency dispenser in accordance with the present invention.

Referring to FIG. 1, there is shown a free standing currency dispenser including a console 10 which houses mechanical operating sections of the system, and in addition customer interface equipment. In the free standing unit, the console 10 is mounted on top of an electronic module 12 which houses the system electronics and power supply. On the front panel of the console 10, there is arranged an array of 13 push button keys 14 for use by a customer to interface with the currency dispenser. Ten of these keys, marked 0 through 9, are to enable a user to insert his assigned identification code for verification of his authority to use a credit card presented to the machine through a card gate 16. One of the remaining three keys is a "clear" push button for correcting mistakes made by the user in inserting his assigned identification code. The remaining two keys are for selecting one or two currency packages to be dispensed. The amount of currency in each such package is controlled by authorized personnel.

In addition to the 13 push button keys, and the card gate 16, the front panel of the console 10 includes an instruction window display 18 that provides for viewing an illuminated display message drum. As will be explained, the messages on this drum instruct a user in the operation of the currency dispenser. The last user interface on the front panel of the console 10 is a cash drawer 20 that fits flush with the panel in a closed and locked position.

Figure 2:
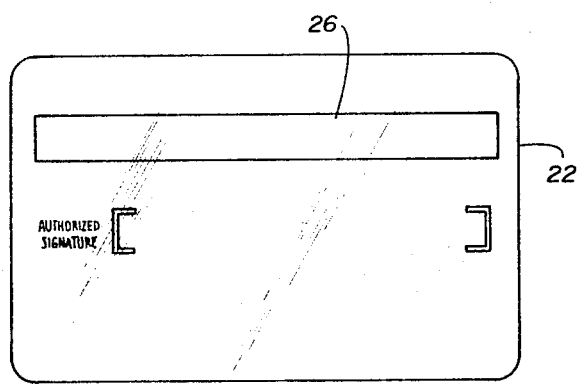
FIG. 2 illustrates a typical credit card for use with the currency dispenser of FIG. 1.

Upon representation of a credit card 22, such as illustrated in FIG. 2, through the card gate 16 to the console 10, it is transported to a plurality of reading stations by a card reader 24 to activate the various systems in a preordered sequence. Typically, a currency dispenser in accordance with the present invention may be activated by a standard "A" size plastic credit card with a stripe 26 of magnetic material located on the backside. The magnetic stripe allows up to 80 numeric characters in four rows to be magnetically encoded for use in providing a complete identification and record of each transaction with the currency dispenser. A magnetic credit card for use in the system described contains the following information:

a. Expiration Date (Year [two digits] and Month [two digits]),
b. Total Allowed Uses (Up to 999[three digits]),
c. Allowed Uses Per Day (Up to 9 [one digit]),
d. Account Number (Variable from 6 to 14 digits),
e. Customer Identification Code (6 digits),
f. Bank Routing and Transit Number (8 digits),
g. Date Last Used (Month [two digits], Day [two digits]), and number of times used per day (one digit),
h. Bank Identification Number (4 digits), and
i. Bank Branch Number (3 digits).

As the credit card 22 moves through the card reader 24, each of the above pieces of information is checked at one of several reading stations. Although many credit card readers are available, the card reader illustrated includes a drive motor 27 activated by a signal from the electronic module 12 and coupled to a series of drive rollers through a belt 28. The series of rollers comprises pinch roller pairs distributed longitudinally along the length of travel of a credit card. In addition to reading stations responsive to the magnetically coded information on the stripe 26, the card reader 26 also includes writing stations for recording a credit card during completion of a currency dispensing operation.

In the normal currency dispensing cycle, a credit card is transported through the card reader 24 in one direction during a first part of a sequence and then returned to the user through the card gate 16 at the second-to-last step in the completion of a cycle. Under certain circumstances, a credit card presented to the machine is retained and not returned to the user. A card retained by the machine is transported through the card reader 24 into an internal storage bin 30. This bin is accessible only to authorized persons having access to the inside of the console 10.

Figure 3:
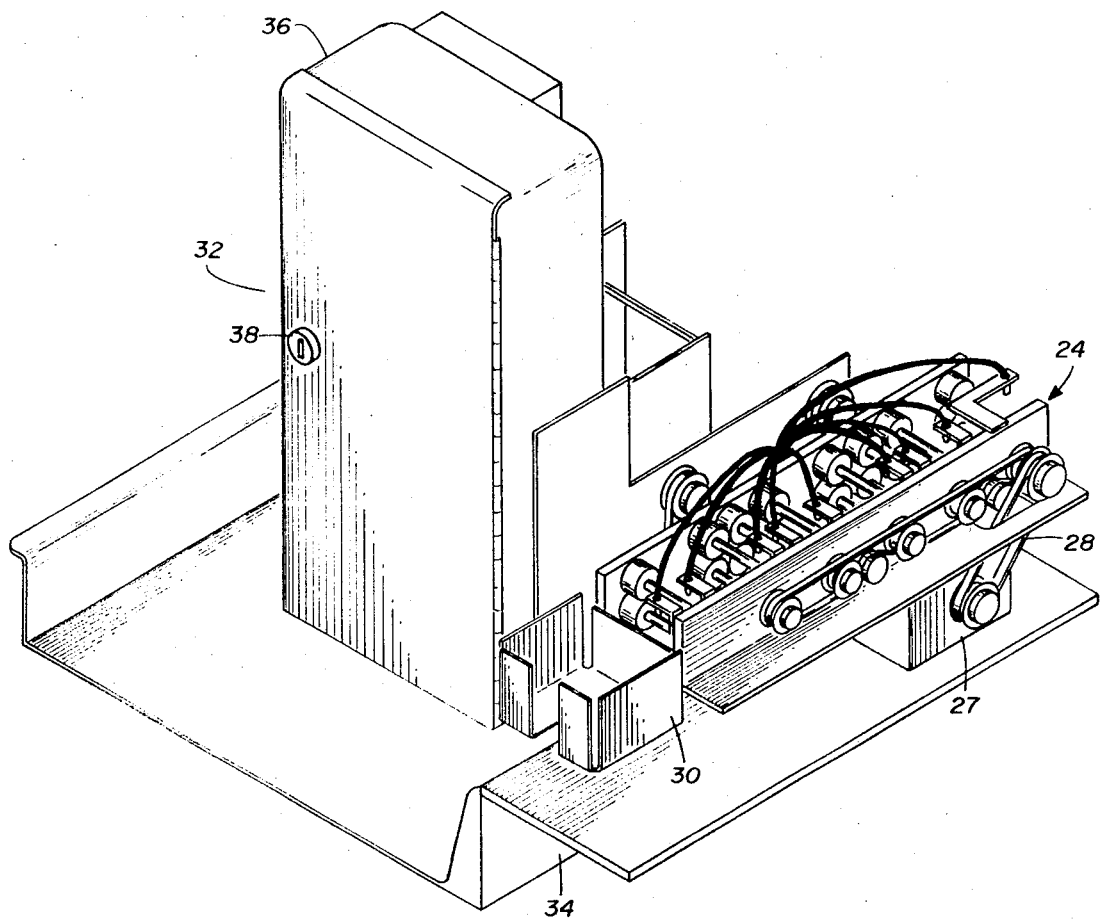
FIG. 3 is a perspective view of a currency packet delivery system and credit card transport system for the dispenser of FIG. 1.

After several verification steps have determined a user is entitled to the currency he has requested, a cash transport 32 is activated by a signal from the electronic module 12 to deliver packets of currency to the cash drawer 20. As illustrated in FIG. 3, the cash transport 32 is mounted alongside the card reader 24 on an equipment rack 34 contained within the console 10. Currency to be dispensed is stored in a cabinet 36 having an opening for feeding packets of currency to a money transport system, as will be explained. Although the console 10 contains security locks to restrict unauthorized entry into the unit, the cabinet 36 also includes a lock 38 for securing money packets stored within the cabinet.

Figure 4:
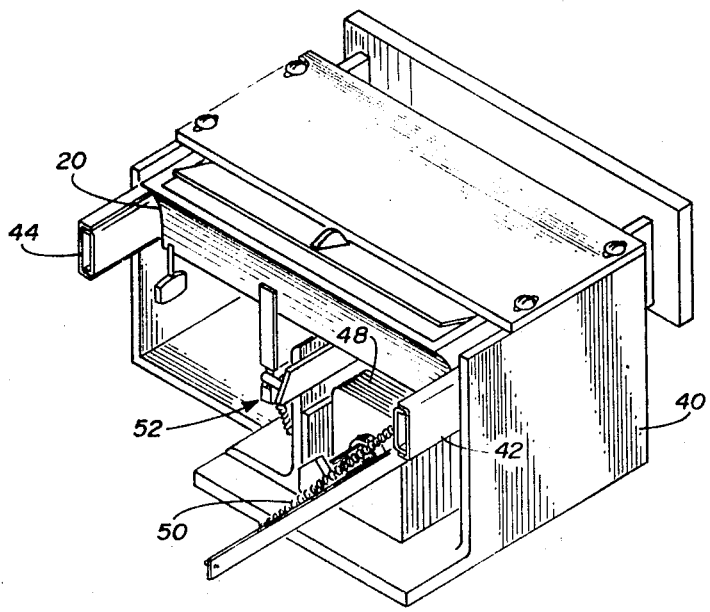
FIG. 4 is a perspective view of the cash drawer for the dispenser of FIG. 1.

Money packets delivered from the cash transport 32 in response to instructions from the electronic module 12 are delivered to the cash drawer 20 included as part of a separate subsystem as illustrated in FIG. 4. The cash drawer 20 is contained with a housing 40 and moves between a closed position as illustrated in FIG. 1 to a partially opened position as illustrated in FIG. 4 along tracks 42 and 44. In addition to numerous switches for sensing the operation of the cash drawer 20, the housing 40 contains a linear motor 48 for forcing the drawer from a closed position to a detent position, as will be explained. Upon receipt of a control signal from the electronic module 12, a latch solenoid is energized and allows a spring 50 to return the drawer 20 to the closed position. A latch mechanism, generally indicated by the numeral 52, locks the drawer 20 in the closed position.

GENERAL SYSTEM OPERATION

In operation of the console 10 and the electronic module 12 to dispense currency to a user, the display 18 instructs a customer to insert his credit card into the card gate 16. This is the first step in a sequence of step-by-step operating instructions leading to a completed transaction.

A second instruction appearing at the display 18 instructs a user to key-in his identification code. This requires that the customer's personal identification number be entered by means of the numbered push button keys 14. By operation of the electronic module 12, the keyed-in number is verified with the number magnetically encoded on the stripe 26 of the customer's credit card 22. If the wrong keys are accidentally pressed before completing a number, the "clear" key is provided to allow the user to try again. On the third incorrect attempt at verification, the card reader 24 delivers the inserted credit card to the bin 30. (This feature is a safeguard against the use of lost or stolen cards.) In this situation, an instruction will appear at the display 18 telling a customer his card has been retained. A printed receipt is then issued telling the user why his card has not been returned.

Following verification, the message "Key In Amount Desired" appears in the lighted display 18. The user now selects one of two fixed amounts, prepackaged in the cash transport 32, by means of one of two currency-amount key push buttons 14. The requested cash amount is delivered to the cash drawer 20 along with a receipt of the transaction. A receipt is printed and issued to a user upon the termination of each transaction whether the transaction has been completed by the dispensing of currency or by a machine detected error. In the latter situation, the receipt explains to the user why currency was not dispensed.

Upon delivery of the currency and the receipt to the cash drawer 20, the electronic module 12 generates a signal to automatically open the cash drawer to a detent position for delivery of the cash and receipt to the user. The cash drawer 20 must be manually extended to facilitate removal of its contents, after which it is automatically retracted and locked by means of the spring 50 and the latch 52. Upon completion of the latching of the drawer 20, the transaction has been completed and the machine is ready for a subsequent transaction.

DETAILED OPERATING SEQUENCE

Figure 5:
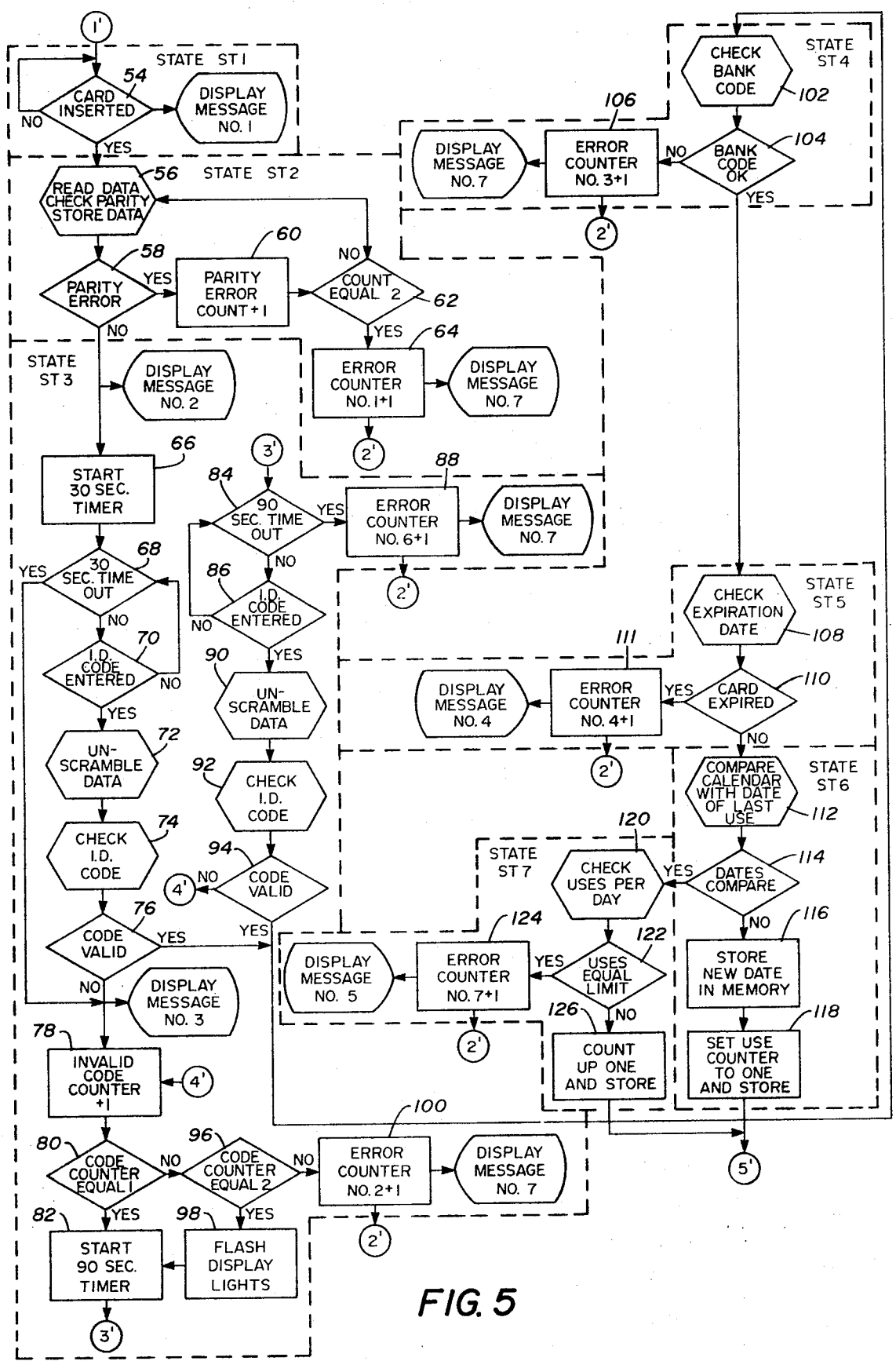
FIGS. 5 through 7 illustrate a flow diagram giving the steps in the operation of the currency dispenser for money delivery to a user of a valid credit card.
Figure 6:
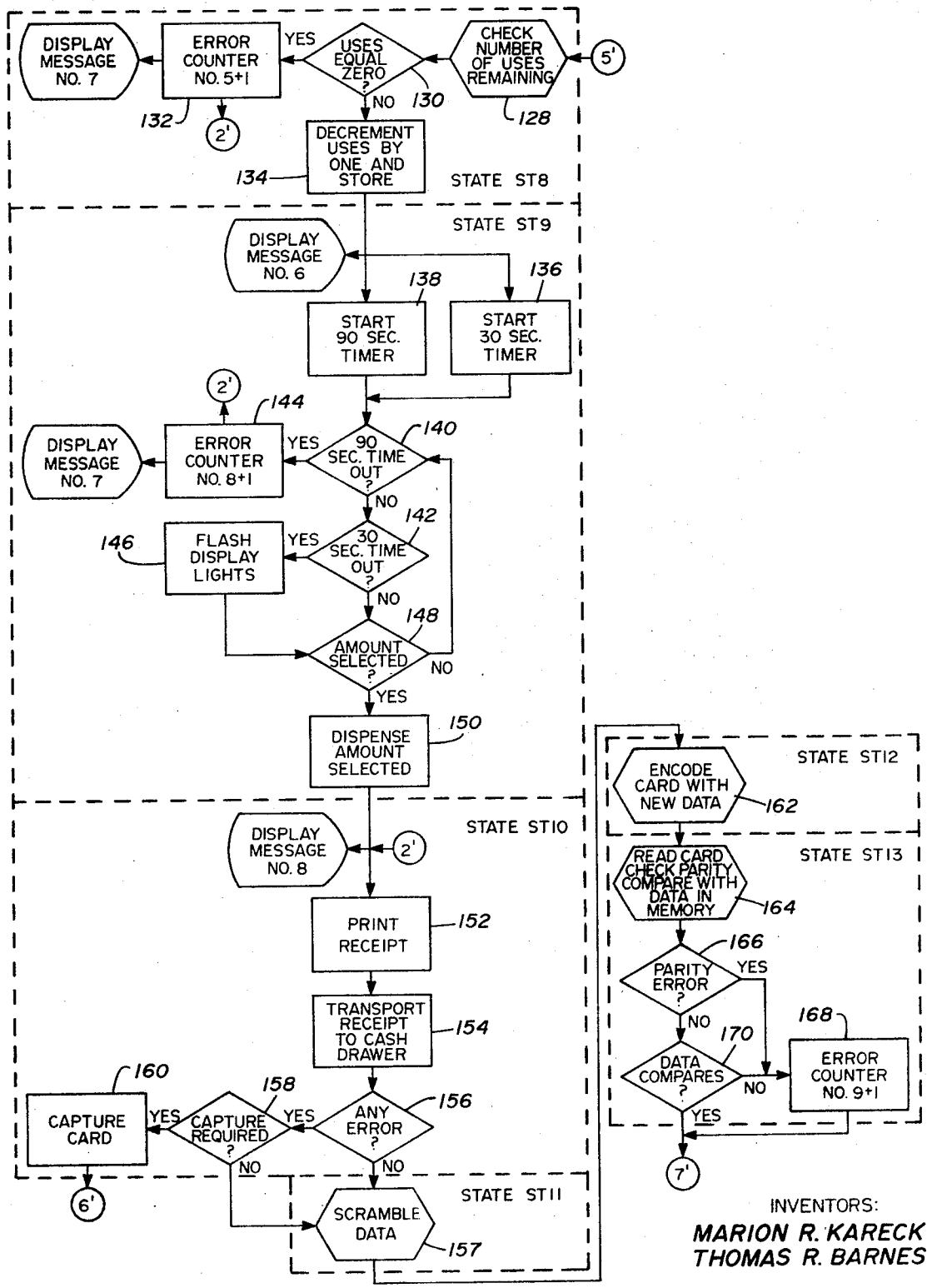
Figure 7:
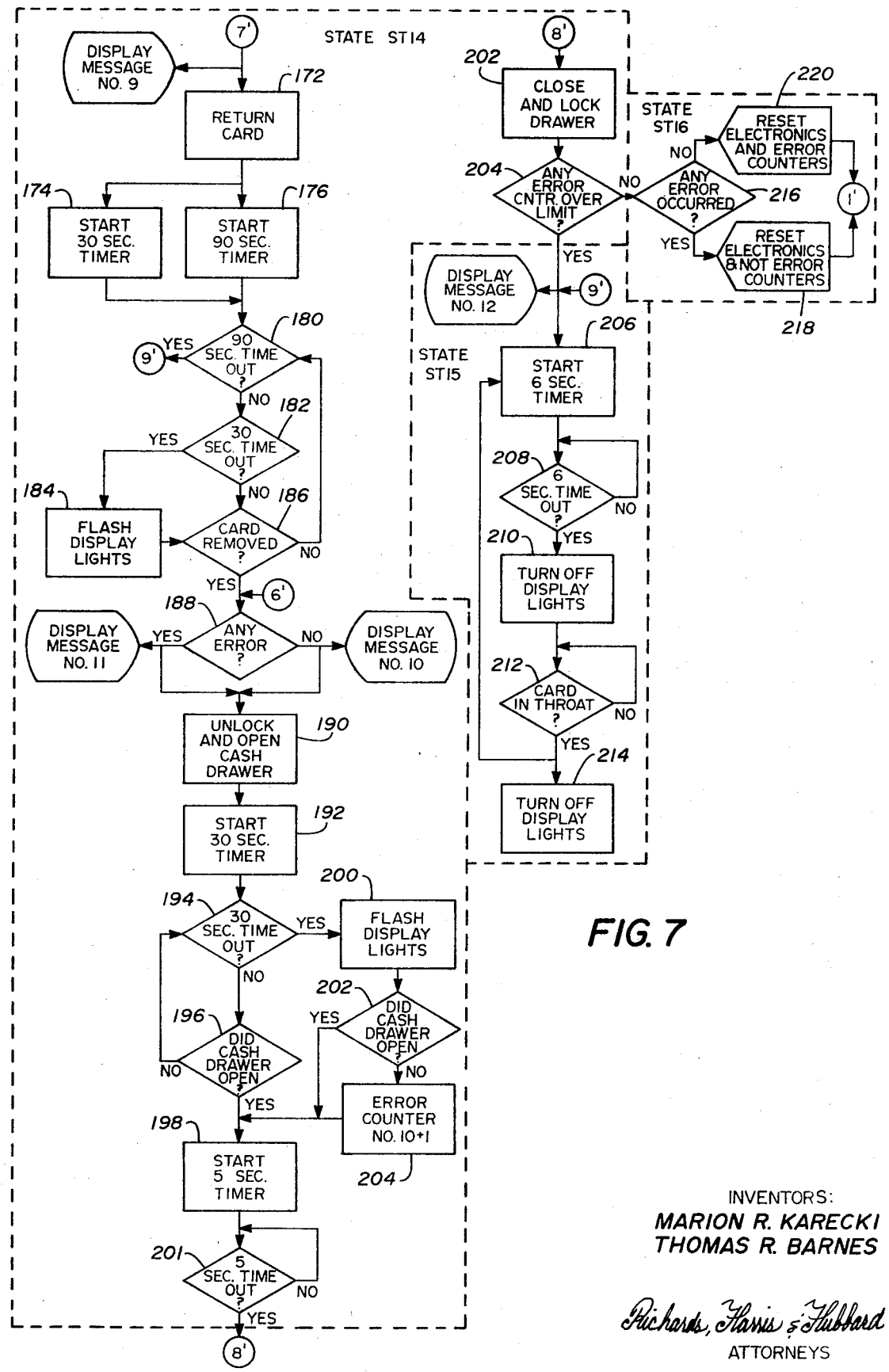

For a detailed operation of the step-by-step sequence of the currency dispenser, reference is made to FIGS. 5 through 7.

In the initial state (ST1) of the currency dispenser, message 1 of Table I will appear at the display 18. Electronic module 12 activates an inquiry 54 to determine if a card has been inserted through the gate 16 after the card format has been checked.

TABLE I

DISPLAY MESSAGES

1. Insert Card
2. Enter I.D. Code
3. Enter I.D. Code Again
4. Card Has Expired
5. Uses Per Day Exceeded
6. Select Amount Desired
7. Transaction Not Complete — Bank will contact you
8. Receipt Being Printed
9. Remove Card
10. Remove Currency and Receipt
11. Remove Receipt
12. Out of Order
12. Out of Order Upon a positive response from the inquiry 54, the sequence proceeds to state ST2. In state ST2, the card reader 24 positions the advancing credit card, and the module 12 completes step 56 to read the scrambled data from the inserted card, check the parity, and store the data read from the stripe 26. State ST2 continues with the inquiry 58 to determine if a parity error exists. A positive response to the inquiry 58 advances the sequence of state ST2 to step 60 and then to inquiry 62. A "yes" response to inquiry 62 advances state ST2 to step 64 to cause message No. 7 of Table I to appear at the display 18. Step 64 also advances the sequence of operation to state ST10; state ST10 will be explained shortly. A "no" response to inquiry 62 returns state ST2 to step 56 and in turn to inquiry 58.

Step 64 makes a check to determine the number of times a parity error has produced a "yes" response to the inquiry 64. If the number of times step 64 has been reached equals an internally set limit, error counter No. 1 of Table 2, then the machine will terminate the present transaction and shut down. For error counter No. 1, on the seventh attempted successive use of the machine which results in a "yes" response to inquiry 62, the machine will shut down. After each successful completion, however, the error counter will reset to zero.

TABLE II

ERROR COUNTER LIMITS

| Counter No. | | Limit |
| --- | --- | --- |
| 1. | Parity Error | 6 |
| 2. | Invalid I.D. Code | 3 |
| 3. | Invalid Bank Code | 6 |
| 4. | Expired Card | 3 |
| 5. | Total Uses Exceeded | 6 |
| 6. | Too Much Time Used To Key In I.D. Code | 3 |
| 7. | Uses Per Day Exceeded | 6 |
| 8. | Too Much Time Used To Select Amount | 2 |
| 9. | Echo Check Error | 3 |
| 10. | Drawer Did Not Open | 2 |

A negative response to the "parity error" inquiry 58 advances the sequence of operation to state ST3. Initially, in state ST3, message No. 2 of Table I appears at the display 18. Simultaneously, a 30 second timer, step 66, is initiated by the electronic module 12. Message No. 2 instructs a user to enter his personal identification number into the machine by means of the push button keys 14. When the user is inserting his personal identification number into the machine, the sequence of operation advances to inquiry 68 to determine if the thirty second limit of step 66 has been exceeded. A "no" response to inquiry 68 advances state ST3 to inquiry 70 to determine if a user's identification code has been entered. If the response to inquiry 70 is "no," the sequence returns to inquiry 68. Inquiries 68 and 70 are continually repeated until either one or the other produces a "yes" response.

A positive response from inquiry 70, indicating that a code has been entered, advances state ST3 to step 72 wherein the scrambled coded data, as read from the magnetic stripe 26, is unscrambled. After unscrambling the data from the stripe 26, the sequence advances to step 74 wherein a comparison of the customer-entered identification code with the card identification code is made. Upon completion of the comparison step 74, the electronic module 12 advances the sequence to inquiry 76 to determine if the customer-entered code and the code read from the magnetic stripe 26 are identical. A "no" response to inquiry 76 advances state ST3 to step 78 and causes message No. 3 of Table I to appear at the display 18. State ST3 is also advanced to this same position upon a "yes" response to inquiry 68 indicating that the thirty second timer 66 has timed out.

Step 78 is completed by the electronic module 12 to determine the number of times an incorrect identification code has been entered by the user. This determination is checked by inquiry 80. Upon the first entering of an incorrect identification code by a user, inquiry 80 produces a positive response advancing state ST3 to step 82 which starts a 90 second timer. At this time, the user is instructed to re-enter his identification code through the push button keys 14 in response to message No. 3 appearing at the display 18. The cycle of operation continues at inquiry 84 with the sequence being continuous between step 82 and inquiry 84. A "no" response to inquiry 84 advances the sequence to inquiry 86 to determine if an identification code has been entered. Inquiries 84 and 86 are continuously cycled until either one or the other produces a "yes" response.

A "yes" response to inquiry 84 indicates that the 90 second timer 82 has timed out and state ST3 advances to step 88. Upon completion of step 88, the sequence advances to state ST10 and the transaction is terminated. As a result of state ST3 advancing to step 88, message No. 7 of Table I appears at the display 18.

Step 88 checks to determine how many previous cycles, i.e., previous uses of the machine, have advanced to that point as a result of timing out of the 90 second timer. When the number of times the sequence has advanced to step 88 equals a set error number, the machine will terminate the present transaction and shut down. For a time out error, the machine will shut down after the fourth sequence, error counter No. 6 of Table II, in succession has advanced to step 88 as a result of the 90 second timer timing out.

A "yes" response to the inquiry 86 advances state ST3 to step 90 wherein the data read from the magnetic stripe 26 and stored in step 56 is unscrambled. After completing the unscrambling step 90, the sequence advances to step 92 where the entered identification code and the unscrambled code are compared. This advances state ST3 to inquiry 94 which is made to determine if the user-entered code and the credit card code favorably compare.

A "no" response to the inquiry 94 returns state ST3 to step 78. Inquiry 80 is again made and the response this time will be negative, advancing state ST3 to inquiry 96. This being the second attempt to insert the correct identification code, inquiry 96 produces a "yes" response advancing state ST3 to step 98 which causes the display 18 to flash message No. 3 and return the sequence to the 90 second timer, step 82. The sequence of steps of inquiries 84 through 94 is repeated. Another "no" response to inquiry 94 again returns the sequence to step 78 and inquiries 80 and 96 are again made. At this time, inquiry 98 will result in a "no" response advancing state ST3 to step 100. In step 100, the electronic module 12 makes an error limit check to determine how many times state ST3 has advanced to this position. When the number of times that state ST3 has advanced to step 100 equals a stored limit, the machine will shut down upon completion of the present transaction. For step 100, the error counter No. 2 of Table II gives the number of successive times an incorrect I.D. code will shut down the machine. The present transaction advances to state ST10 and message No. 7 of Table I appears at the display 18. If this is not the fourth successive attempt to use the machine, the present transaction will be terminated and the machine will be returned to the initial state.

A positive response to either inquiry 76 or inquiry 94, indicating a valid code has been entered through the push button keys 14, advances the transaction to step 102 of state ST4. In step 102, the module 12 compares the bank code read from the magnetic stripe 26 of the inserted credit card, after unscrambling, with a bank code stored in the module 12. Upon completion of step 102, state ST4 advances to inquiry 104. A "no" response to inquiry 104 advances the sequence to step 106 and message No. 7 of Table I appears at the display 18. Step 106 compares the number of times the overall sequence has advanced to that state with a preset limit, error counter 3 of Table II. If the number of times the sequence advances to step 106 does not equal the stored limit, the sequence advances to state ST10 and completes the transaction. If the error limit plus one has been reached, the machine will shut down.

A "yes" response to inquiry 104 completes state ST4 and advances the sequence to state ST5. Initially, in state ST5, step 108 is completed. Step 108 is a further check on the data read from the magnetic stripe 26. Step 108 compares the expiration date of the credit card with the calendar date. Inquiry 110 is made and a positive response advances state ST5 to step 112 and message No. 4 of Table 1 appears at the display 18. In step 112, the module 12 determines the number of times the sequence has advanced to this point, error counter 4 of Table II. If the sequence advances to step 112 once more than the number of times as stored in the module 12, the sequence advances to state ST10 and shuts down. If there has been three or less successive sequences advanced to step 112, the present transaction will be completed and the machine returned to the initial state. A "no" response to inquiry 110 completes state ST5 and advances the operation to state ST6.

In state ST6, the first operation, step 112, compares the calendar date with the date of last use as read from the magnetic stripe 26. If the calendar date does not agree with the date of last use, indicating the card has not been used that day, inquiry 114 results in a "no" response and state ST6 advances to step 116. Step 116 stores the calendar date in a memory of the electronic module 12 for subsequent encoding on the magnetic stripe 26. Upon completion of storage of the calendar date, state ST6 advances to step 118. Step 118 sets a use counter to 1 and stores this information in a memory for subsequently encoding on the magnetic stripe 26.

A "yes" response to the inquiry 14, indicating that the card has been previously used on the calendar date, advances the sequence from state ST6 to state ST7. In state ST7, step 120 compares the number of uses made for that day with an established use limit. If the number of uses of the card in the card reader 24 equals the established limit, an inquiry 122 results in a "yes" response thereby advancing state ST7 to step 124 and message No. 5 of Table I appears at the display 18. In step 124, the electronic module 12 compares the number of times the sequence has advanced to that point with a stored number, error counter 7 of Table II. If state ST7 advances to step 124 by an amount equal to the stored limit plus one, indicating seven successive uses of the machine have advanced the sequence to step 124, the machine will complete the present transaction by advancing to state ST10 and then shut down. If less than seven successive uses has advanced the sequence to step 124, the present transaction will be completed through state ST10 and the machine returned to the initial state.

A "no" response to inquiry 122 advances state ST7 to step 126 which adds another use to the total number of uses per day and stores this information for subsequent encoding on the magnetic stripe 26.

Upon completion of either step 118 of state ST6 or step 126 of state ST7, the machine operation advances to state ST8, as appears in FIG. 6. Initially, in state ST8, step 128 compares the number of total uses made of the credit card with the total number of allowed uses. Note that this is not the uses allowed per day, but rather the total number of uses that can be made of a credit card. If the number of total uses remaining equals zero, an inquiry 130 results in a "yes" response advancing state ST8 to step 132 and causing message No. 7 of Table I to appear at the display 18. In step 132, the electronic module 12 checks to determine the number of times state ST8 has advanced to this point, error counter 5 of Table II. If it has advanced to the total number of times allowed, the sequence will advance to state ST10 and complete the present transaction by retaining the card and printing a receipt advising the user his card has been retained. A "no" response to the inquiry 130 indicates that another use of the credit card 22 remains and state ST8 advances to step 134. Step 134 reduces the total number of remaining uses by 1 and advances the sequence to state ST9.

Initially, in state ST9, message No. 6 of Table I appears at the display 18 and the thirty second timer of step 136 and the 90 second timer of step 138 are activated. Electronic module 12 monitors both the 90 second timer, step 138, and the 30 second timer, step 136, by inquiries 140 and 142, respectively. Inquiry 140 checks the 90 second timer of step 138. If the 90 second timer has timed out, inquiry 140 results in a "yes" response advancing state ST9 to step 144 and causing message No. 7 to appear at the display 18. Step 144 is one of those that checks the operation of the complete system. In step 144, the module 12 evaluates the number of times the 90 second timer has timed out, error counter 8 of Table II. If the number of times step 144 has been reached equals the number stored in the module 12 plus one, the machine will complete the present transaction and shut down. If the limit has not been reached, the present transaction will be completed and the machine returned to the initial state. The present transaction is completed by advancing the sequence from step 144 to state ST10.

A "no" response to the inquiry 140 advances state ST9 to inquiry 142 which checks the 30 second timer, step 136. If the 30 second timer has timed out, inquiry 142 produces a "yes" response thereby initiating step 146 which produces a flashing display 18. The message at 18 will be to instruct the user to select the amount of currency desired to be dispensed. Upon either a "no" response to the inquiry 142 or upon completion of step 146, state ST9 advances to the inquiry 148. If an amount of currency to be dispensed has not been selected by the user, inquiry 148 results in a "no" response thereby returning the sequence to inquiry 140. After a user has selected the amount of currency to be dispensed, the inquiry 148 produces a "yes" response and state ST9 advances to step 150. Step 150 activates the cash transport 32 to deliver the number of required currency packets to the cash drawer 20. After delivery of the currency packets to the cash drawer 20, state ST9 is completed and the sequence advances to state ST10.

Initially, in state ST10, message No. 8 of Table I appears at the display 18 and step 152 is completed. In step 152, the electronic module 12 activates a receipt printer to generate a receipt of the transaction. This receipt is transported to the cash drawer 20 in step 154. Upon completion of step 154, state ST10 advances to inquiry 156. Inquiry 156 is made to determine if state ST10 has been reached through states ST1 to ST10 in a normal sequence, or whether an error has advanced the sequence, out of order, to state ST10. In the latter situation, when an error has advanced the sequence to state ST10, the sequence advances to inquiry 158. Inquiry 158 is made to determine whether the error requires the capture of the credit card in the reader 24. A "yes" response will result from inquiry 158 when (1) three attempts have been made to insert an identification code, all of which were erroneous, (2) the expiration date of the card has passed, or (3) the total number of uses has been reached. The result of a "yes" response to inquiry 158 advances the sequence to step 160 wherein the electronic module 12 activates the card reader 24 to deliver the card to the storage bin 30. After completion of step 160, the sequence advances to state ST14, shown in FIG. 7.

If the sequence of operation of the machine has advanced to state ST10 through a normal operating cycle, the inquiry 156 produces a "no" response. This completes state ST10 and advances the operation to step 157 of state ST11. A "no" response to the inquiry 158 also completes state ST10 and advances the sequence to state ST11. The only step completed in state ST11 is that of rescrambling the data to be stored on the magnetic stripe 26.

Upon completion of the scrambling technique, the sequence advances to state ST12 wherein step 162 encodes the magnetic stripe 26 with the scrambled updated data. Step 162 comprises the entire operation of state ST12; upon completion of the encoding of the credit card, the sequence advances to state ST13.

In state ST13, the first operation, step 164, reads the encoded card to check the parity and compare the updated data with data stored in memory in the electronic module 12. Upon completion of step 164, inquiry 166 is made to determine if there are any parity errors. A parity error produces a "yes" response to inquiry 166 and advances the sequence to step 168. Step 168 is an error determining step for checking the overall operation of the machine, error counter 9 of Table II. When the state ST13 has reached step 168, the module 12 checks to determine how many previous occasions this step has been reached. If it equals a preset number of times plus one, four in this case, the sequence advances to complete the present transaction and the machine shuts down. Step 168 will be reached if the result of inquiry 168 is positive or if the inquiry to 170 is negative. Inquiry 170 is made when the inquiry 166 results in a negative answer.

A positive response to the inquiry 170 completes state ST13 and advances the sequence to state ST14, FIG. 7. Upon reaching state ST14, message No. 9 of Table I appears at the display 18 and a return card step 172 is completed. The return card step 172 is performed by the card reader 24 giving the user access to his credit card through the card gate 16. Upon returning the credit card 22 to the card gate 16, a 30 second timer of step 174, and a 90 second timer of step 176, are activated. Following activation of these timers, an inquiry 180 is made to determine if the ninety second timer has timed out before the user removes his card. If the inquiry 180 produces a "yes" response indicating that the 90 second timer of step 176 has timed out, the remainder of state ST14 is bypassed and, the sequence advances to state ST15.

A "no" response to the inquiry 180 indicates that the 90 second timer is still running and the sequence advances to the inquiry 182. Inquiry 182 is made to determine if the 30 second timer of step 174 has timed out. A "yes" response to the inquiry 182 advances the sequence to step 184. In step 184, the electronic module 12 flashes message No. 9 of Table I on the display 18 in an effort to attract the user's attention. Upon completion of step 184, that is, flashing the display 18, the sequence of state ST14 advances to inquiry 186. State ST14 also advances to inquiry 186 upon a negative response from the inquiry 182.

Inquiry 186 is made to determine if the user has removed his credit card from the card gate 16. A "no" response to this inquiry returns the sequence to inquiry 180. A positive response to the inquiry 186, indicating that the user has removed his credit card, advances the sequence to inquiry 188. Inquiry 188 is also activated upon a positive response to the inquiry 158 of state ST10. A positive response to inquiry 188 causes message No. 11 of Table I to appear at the display 18 and a negative responsive to this inquiry causes message No. 10 of Table I to appear at the display 18. In either case, state ST14 advances to step 190. In step 190, the electronic module 12 activates the latch 52 and energizes the linear motor 48 to position the cash drawer 20 to the detent position. At the same time a 30 second timer of step 192 is activated. Inquiry 194 is made as a check to determine when the timer of step 192 has timed out. A negative response to step 194 advances the sequence of state ST14 to inquiry 196. Inquiry 196 is made to determine if the cash drawer has been extended to facilitate removal of its contents. A "no" response to inquiry 196 returns the sequence to inquiry 194. A "yes" response to inquiry 196 advances the sequence of state ST14 to step 198.

State ST14 also advances to step 198 upon a positive response to the inquiry 194. Such a response advances the sequence to step 200 which is a flashing light operation to cause the display 18 to flash either message No. 10 or message No. 11. After the flashing operation has commenced, inquiry 202 is made to determine if the cash drawer 20 has been extended to remove the contents thereof. A "no" response to the inquiry 202 advances the sequence to step 204 which is an error counter operation. In step 204, the electronic module 12 checks to determine in how many successive sequences has the drawer not been opened after advancing to this step. If the step 204 has been activated a number of times equal to a preset value stored in the electronic module 12, error counter 10 of Table II, the system will complete the present transaction and shut down.

Upon a "yes" response to the inquiry 202 or upon a completion of the step 204, state ST14 advances to step 198. Step 198 includes a 5 second timer for timing how long the cash drawer is held in the detent position after being manually extended. Upon starting the 5 second timer of step 198, inquiry 201 is made to check the operation of the timer. A "no" response to the inquiry 201 indicates that the 5 second timer has not timed out and inquiry 201 is continuously made until a positive response results. A positive response to the inquiry 201 advances the sequence to step 202 which activates the latch 52 to allow the spring 50 to automatically retract the cash drawer 20. A latch then locks the cash drawer 20 until the next transaction.

Upon completion of the step 202, an inquiry 204 is made. Inquiry 204 is made to determine if any of the error counter steps have been activated. If any of the error counting steps have been activated, the inquiry 204 produces a positive response.

A positive response to the inquiry 204 completes state ST14 and advances the sequence to state ST15. The sequence of state ST15 is also initiated as the result of a positive response to the inquiry 180 of state ST14. Initially, message No. 12 of Table I appears at the display 18 and a step 206 is activated to start a 6 second timer. The entire purpose of state ST15 is to display message No. 12 and turn off the display lights. This state includes inquiry 208 which cycles until the timer of step 206 has timed out. At that time, the inquiry 208 produces a "yes" response thereby activating step 210 to turn off the display lights. State ST15 is completed by inquiry 212 and step 214.

If the inquiry 204 results in a negative response, indicating that currency was dispensed without activating any of the error counting steps, the sequence advances to state ST16. State ST16 is a state in which the machine resets itself in preparation for another cycle. Initially, in state ST16, an inquiry 216 is made. A positive response to inquiry 216 activates step 218 and a negative response activates step 220. Both steps 218 and 220 ready the console 10 for inquiry 54 of state ST1.

CASH DRAWER

At the completion of the inquiry 188 of state ST14, the sequence of operation advances to step 190. Step 190 is the first of a series of operating steps and inquiries that terminates at step 202 to define the operation of the cash drawer 20.

Referring to FIGS. 8-11, there is shown a cash drawer assembly including the housing 40 with the parallel tracks 42 and 44 for supporting and guiding the cash drawer 20. The cash drawer 20 is shown locked in its closed position by means of the latch bar assembly 52 engaging a stop bracket 230 attached to the bottom of the cash drawer.

Throughout the operation of the cash dispensing sequence until step 190 of state ST14, the latch bar assembly 52 holds the drawer 20 in a closed and locked position. During step 190, a signal is applied to a solenoid 232 thereby rotating the latch bar 234 counterclockwise about a pivot point 236 against the force of an extension spring 238. At the same time, an energizing signal is applied to the linear motor 48 thereby causing an armature 240 to be extended to the left against the stop bracket 230.

As the armature 240 moves to the left against the bracket 230, it forces the drawer 20 from a closed position against a force exerted by the drawer spring 50. Movement of the drawer 20 from the closed position actuates a microswitch 248. Actuating the microswitch 248 interrupts the circuit to the solenoid 232 and the latch bar 234 rotates clockwise to a horizontal position by means of the spring 238.

After the cash drawer 20 has been moved to a first detent position as defined by the stop bracket 230 passing the end of the latch bar 234, the linear motor 48 is deenergized. The solenoid 232 is also deenergized thereby allowing the spring 238 to return the latch to its normal position. The drawer spring 50 then pulls the drawer back to the detent position with the stop bracket 230 engaging the end of the latch bar 234.

The cash drawer 20 has now been positioned, as illustrated in FIG. 4, for a user to withdraw the currency packet 243 delivered thereto by the cash transport 32 through the delivery throat 244. Upon positioning the cash drawer 20 at the detent location, step 192 of sequence ST14 starts the 30 second timer. To start the 30 second timer interval when the drawer 20 reaches the detent position, a switch plate actuator 246 attached to the rear of the drawer actuates the microswitch 248 thereby generating a signal to the logic circuit of FIG. 13. If the user of the cash dispenser fails to open the drawer from the detent position within this 30 second interval, the solenoid 232 is again energized rotating the latch bar 234 counterclockwise. The drawer spring 50 pulls the cash drawer 20 to the closed position and the solenoid 232 is deenergized by a 100 millisecond pulse. This returns the latch bar 234 to the position illustrated in FIG. 9, again securely latching the drawer 20 in the closed position.

In the usual mode of operation, a user opens the cash drawer from the detent position upon a receiving an appropriate instruction at the display 18. After a user has removed his currency packet and printed receipt, he releases the cash drawer 20. The drawer spring 50 then returns the cash drawer to the detent position with the stop bracket 230 against the end of the latch bar 234. As the drawer 20 returns to the detent position, it again actuates the microswitch 250 and a signal is generated and transmitted to the module 12 starting the 5 second timer of step 198 of state ST14. The purpose of this 5 second timer is to allow the user to reopen the cash drawer 20 should he have not completed the removal of his currency of printed receipt.

When the 5 second time interval has elapsed, the control module 12 again generates a signal to energize the solenoid 232 for 100 milliseconds. Energizing the solenoid 232 at this time, allows rotation of the latch bar 234 counterclockwise thereby allowing the drawer spring 50 to return the cash drawer 20 to the fully closed position. After the 100 millisecond pulse, the solenoid 232 is deenergized and the latch bar 234 returns to the horizontal position and the cash drawer 20 is securely locked, as explained.

As the currency packet 243 enters the cash drawer 20, it is deflected into the drawer by a deflector plate 350. The deflector plate 350 is rotatably mounted to the cash drawer 20 by means of a pivot pin 352 and is biased into the position illustrated by means of a spring (not shown).

Upon movement of the drawer 20 from the closed position, a cam 354, mounted to the deflector plate 350, engages the top plate 254 thereby rotating the deflector plate clockwise. Rotating the deflector plate 350 produces a sweeping action that forces any currency packets or printed receipts into the drawer. Further, rotating the deflector plate provides a shield to prevent a currency packet or receipt from being blown back into the machine when the drawer is in the fully opened position.

If, during the operation of the cash drawer assembly, the linear motor 48 remains in an energized state, it will have a tendency to overheat. Upon the occurrence of this malfunction the cash dispenser will be shut down by an overheat protection relay 252, mounted to the top plate 254 of the housing 40.

Figure 13:
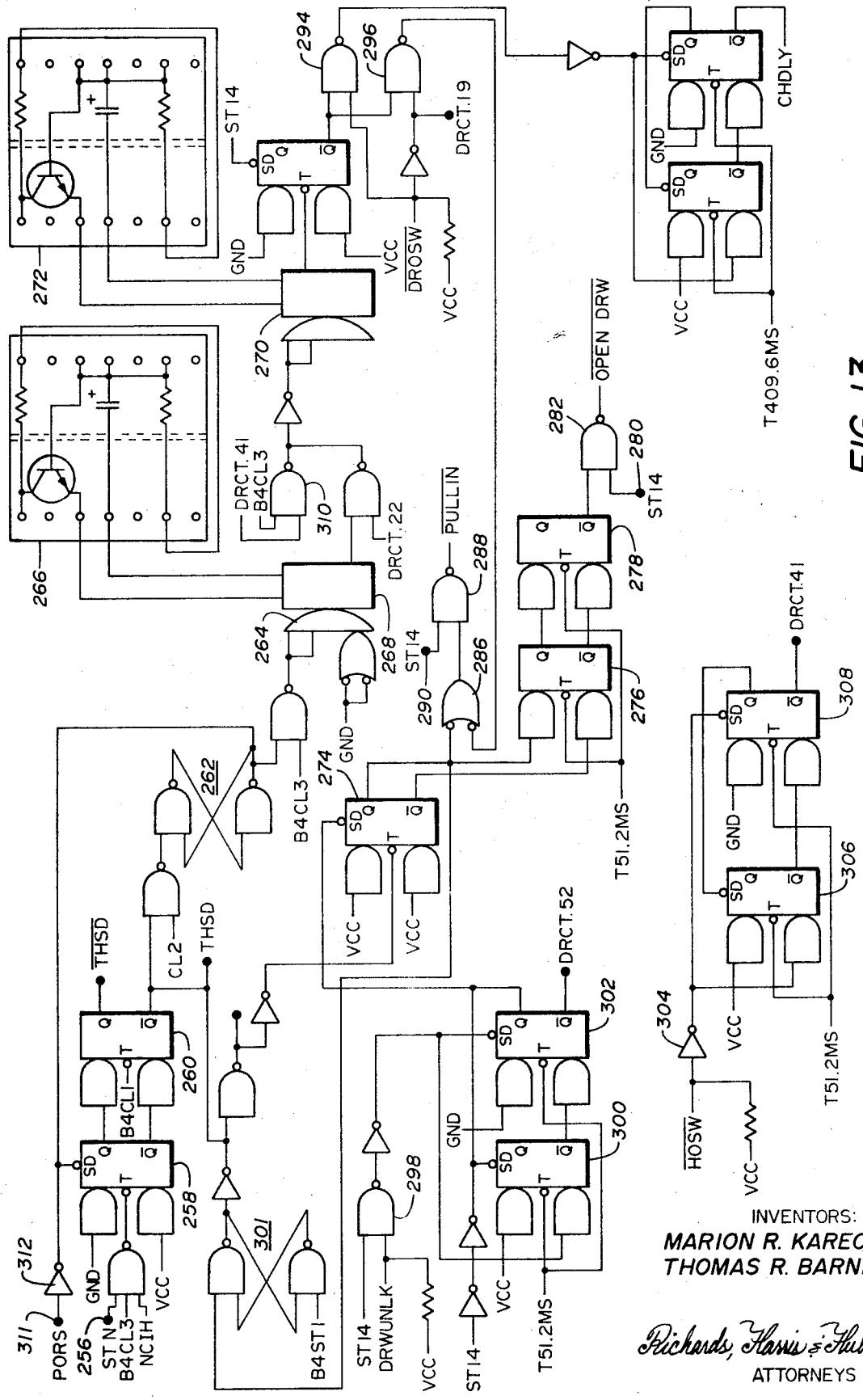
FIG. 13 is a logic diagram of the cash drawer control system for sequencing the operation thereof.

Referring to FIGS. 12 and 13, there is shown an electrical schematic for the cash drawer assembly and a logic diagram for controlling the sequence of operation of the cash drawer. At the beginning of step 190 of state ST14, the control module 12 generates a signal that appears at the terminal 256 to advance the state of the flip-flops 258 and 260. The Q output of the flip-flop 260 enables the bistable circuit 262 which generates a signal to a NAND gate 264 to start a 90 second timer 266. Coupled to the NAND gate 264 is a register 260 that generates a signal to a register 270 to start a 30 second timer 272.

A signal at the Q output of the flip-flop 260 is also applied to advance a flip-flop 274 which in turn reverses the logic level of the flip-flops 276 and 278. The Q output of the flip-flop 274 will now be at a logic ONE level which is applied to the OR gate 286 that in turn generates a logic ONE signal at one of the two inputs to a NAND gate 288. A second input to the NAND gate 288 is a signal from the control module 12 at terminal 290. This signal is applied to the terminal 290 during step 190 of state ST14. The NAND gate 288 now generates a signal to terminal 292 of FIG. 12 thereby energizing the solenoid 232 to unlock the cash drawer 20, as explained.

At the same time, a signal from the control module 12, applied to terminal 280 during step 190 of state ST14, closes the NAND gate 282 to generate a signal at the terminal 284 of FIG. 12 to energize the linear motor 48. As explained previously, energizing the solenoid 232 and the linear motor 48 causes the cash drawer 20 to be opened to the detent position. Opening the cash drawer 20 to the detent position actuates the microswitch 248, also shown schematically in FIG. 12, to generate a signal to the NAND gate 294 and the NAND gate 296 of a timeout circuit to disconnect the timers 266 and 272 from the NAND gate 288.

As the drawer 20 moves to the detent position, it actuates the microswitch 248 thereby generating a signal at the NAND gate 298 to reverse the logic state of flip-flops 300 and 302. The Q output of the flip-flop 302 connects to the flip-flop 274 which now returns to its original logic state and in turn reverses the logic level of one input to the NAND gates 282 and 288. Reversing the logic level of one input to the NAND gates 282 and 288 deenergizes the linear motor 48 and the solenoid 232, respectively.

When the user opens the cash drawer 20 to a fully opened position, he actuates the microswitch 250, also shown schematically in FIG. 12, thereby applying a logic signal to an inverting amplifier 304 to generate a logic ONE signal to the flip-flops 306 and 308. The Q output of the flip-flop 308 is connected to a NAND gate 310 in the circuit of the register 270. This signal to the NAND gate 310 stops the 30 second timer 272. Opening the cash drawer 20 also allows the microswitch 248 to return to its normal position thereby generating a drawer open signal to the NAND gates 294 and 296. Generating a drawer open signal to the NAND gates 294 and 296 disconnects the timing circuit 266 from the NAND gate 288.

After the user has completed his transaction and allows the cash drawer 20 to return to the detent position, the microswitch 250 is again actuated to generate a home signal to flip-flops 306 and 308. This starts the 5 second timer of step 198 of state ST14. Returning the drawer to the home position also actuates the microswitch 248 and after the 5 second timeout, a logic ONE signal is generated at the OR gate 286 thereby generating a 100 millisecond energizing signal for the solenoid 232. This pulls in and locks the cash drawer 20, as explained.

Pulling in and locking the cash drawer 20 completes step 202 of state ST14 and advances the dispensing sequence to state ST16. In state ST16, a reset signal is generated at the terminal 310 of an inverting amplifier 312. The signal applied to the terminal 310 resets the flip-flop 258 and returns the bistable circuit 262 to its original state thereby resetting the cash drawer logic system for the next operating sequences of the cash drawer 20.

The cash transport system described herein is further described and claimed in the co-pending application Ser. No. 58,888, filed July 28, 1970, of Marion R. Karecki, George R. Chastain and Thomas R. Barnes.

The method of unscrambling data in accordance with coding keys and rescrambling data in accordance with other coding keys described herein is described and claimed in the co-pending application Ser. No. 59,146, filed July 29, 1970, of Kenneth S. Goldstein and John D. White.

A system for sequencing the operation of the cash dispenser described herein is described and claimed in the co-pending application Ser. No. 59,150, filed July 29, 1970, of Thomas R. Barnes, George R. Chastain and Don C. Wetzel.

The card transport and gate control system described herein is described and claimed in the co-pending application Ser. No. 59,241, filed July 29, 1970, of John R. Hicks and William C. Bortzfield.

While only one embodiment of the invention, together with modifications thereof, has been described in detail herein and shown in the accompanying drawings, it will be evident that various further modifications are possible without departing from the scope of the invention.

What is claimed is:

1. In a control system for dispensing apparatus comprising:
    means for positioning a dispensing container from a retracted closed position to a partially opened position to be drawn to a fully opened position by a user of the dispensing apparatus,
    timing means for measuring the length of time the dispensing container remains in the partially opened position, and
    means for returning the container to a closed position from the partially opened position upon the expiration of a preselected time interval.

2. In a control system for dispensing apparatus as set forth in claim 1 including means for resetting said timing means when the dispensing container is drawn to a fully opened position.

3. In a control system for dispensing apparatus as set forth in claim 1 including second timing means actuated upon the return of the dispensing container to the partially opened position from the fully opened position connected to said means for returning the container to a closed position.

4. In a control system for dispensing apparatus as set forth in claim 1 including means for returning the dispensing container from the fully opened position to the partially opened position.

5. In a control system for dispensing apparatus comprising:
    motor means operably connected to a dispensing container for positioning thereof from a fully retracted position to a partially opened position upon energization thereof,
    latch means for latching said dispensing apparatus in the partially opened position to be drawn to a fully opened position by a user of the dispensing apparatus,
    timing means for measuring the length of time the dispensing container remains in the partially opened position,
    means for returning the dispensing container from the fully opened position to the partially opened position and from a partially opened position to the fully retracted position, and
    means for actuating said latch means for releasing the container from the partially opened position upon the expiration of a preselected time interval as measured by said timing means for return of the container to a retracted closed position.

6. In a control system for dispensing apparatus as set forth in claim 5 wherein said timing means includes a first timer actuated by positioning the container from a fully retracted position to a partially opened position and a second timer actuated when the container returns from a fully opened position to the partially opened position.

7. In a control system for dispensing apparatus as set forth in claim 6 wherein said means for actuating said latch means includes a solenoid actuator connected to said timing means.

8. In a control system for dispensing apparatus as set forth in claim 6 including means for resetting said first timer when the dispensing container is drawn to a fully opened position and starting said second timer when returned to the retracted closed position.

9. In a money dispensing apparatus comprising:
    a cash drawer for delivering packets of money to a user of the dispensing apparatus, said drawer having a retracted, a partially opened, and a fully opened position,
    motor means connected to said cash drawer for positioning to the partially opened position,
    latching means engaging said cash drawer when in a partially opened position to maintain said drawer therein to enable it to be drawn to the fully opened position by a user of the dispensing apparatus,
    timing means for measuring the length of time the cash drawer remains in the partially opened position,
    means for returning said cash drawer from the fully opened position to the partially opened position and from the partially opened position to the retracted position, and
    a solenoid actuator coupled to said latching means and responsive to said timing means for releasing the cash drawer upon the expiration of preselected time intervals to be returned to the retracted position.

10. In a cash dispensing apparatus as set forth in claim 9 wherein said means for returning the cash drawer to the partially opened position and the retracted position includes a spring connected to said cash drawer.

11. In a cash dispensing apparatus as set forth in claim 9 including deflector means mounted to said cash drawer for deflecting packets of money into said drawer.

12. In a cash dispensing apparatus as set forth in claim 11 wherein said deflecting means includes:
    a deflecting plate rotatably mounted to said cash drawer,
    a spring for biasing said plate into a deflecting position, and
    a cam for rotating said deflecting plate to produce a sweeping action as said cash drawer moves from the retracted to the partially opened position.

13. In a cash dispensing apparatus as set forth in claim 9 wherein said timing means includes a first microswitch actuated by the drawer moving from the retracted position to the partially opened position, a second microswitch actuated by the drawer in the partially opened position, and a third microswitch actuated by the drawer moving to and from the fully opened position.

14. In a cash dispensing apparatus as set forth in claim 13 wherein said timing means further includes a logic control circuit responsive to a cash dispensing signal and the condition of said three microswitches.

15. In a cash dispensing apparatus as set forth in claim 13 wherein said timing means generates a signal to said solenoid actuator after a time interval of 5 seconds has elapsed when the cash drawer returns from the fully opened position to the partially opened position.

16. In a cash dispensing apparatus as set forth in claim 13 wherein said timing means generates a signal to said solenoid actuator at the expiration of a 30 second time interval after said motor means positions the cash drawer to the partially opened position.

17. A method of article dispensing from dispensing apparatus in response to an energizing signal from a control module, comprising the steps of:
  energizing a motor actuator to position a dispensing container to a detent position from a fully retracted position;
  actuating a latch bar for releasing the dispensing container from the fully retracted position and for maintaining said container in the detent position,
  returning said container to the fully retracted position from the detent position at the expiration of a preset time interval,
  interrupting the preset timing interval upon the movement of said container from the detent position to a fully opened position, and
  returning the dispensing container from the fully opened position to the retracted position.

18. A method of article dispensing as set forth in claim 17 including the steps of:
  stopping the container at the detent position after being returned from the fully opened position for a second preset time interval, and
  returning the container to the retracted position at the termination of said second time interval.

19. The method of dispensing articles as set forth in claim 18 including the step of sensing the movement of the container from the retracted position to the detent position to initiate said first timing interval.

20. The method of dispensing articles as set forth in claim 19 including step of sensing the movement of said container from the detent position to the fully opened position to interrupt the first timing interval.

21. The method of dispensing articles as set forth in claim 20 including the step of sensing the movement of said container from the fully opened position to the detent position to start the second timing interval.

* * * * *